Figure 1:
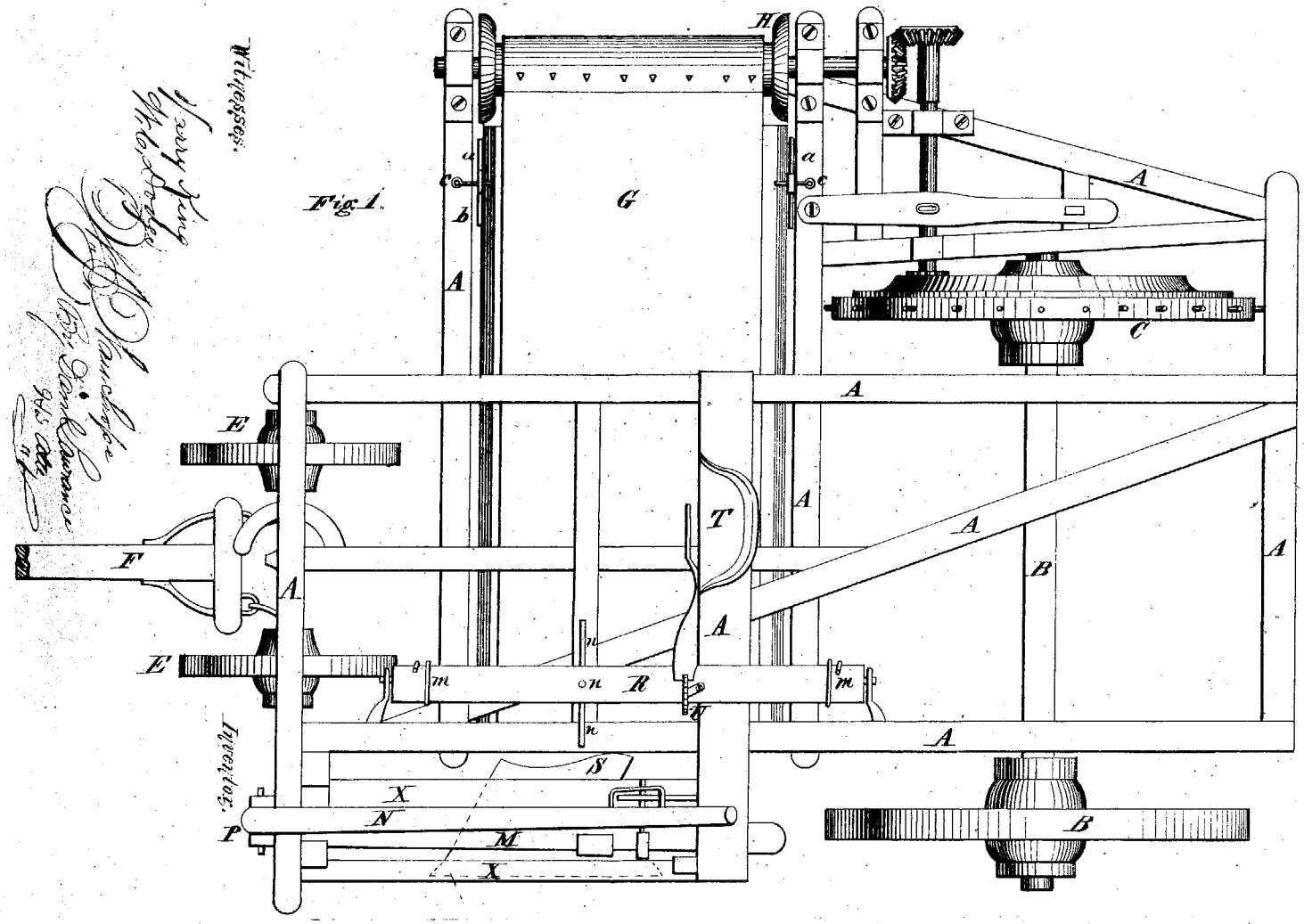

(51.)

Sheet 1. (2 Shts.)

WILLIAM J. WAUCHOPE.

Improvement in Ditching and Grading Machines.

No. 4,676. Reissued Dec. 12, 1871.

Witnesses.

Harry King
Wm. Dodge

Inventor.

Wm. J. Wauchope
By Frank Lawrance
his atty (51.)
Sheet 2. (2 Sheets)
WILLIAM J. WAUCHOPE.
Improvement in Ditching and Grading Machines.
No. 4,676. Reissued Dec. 12, 1871.
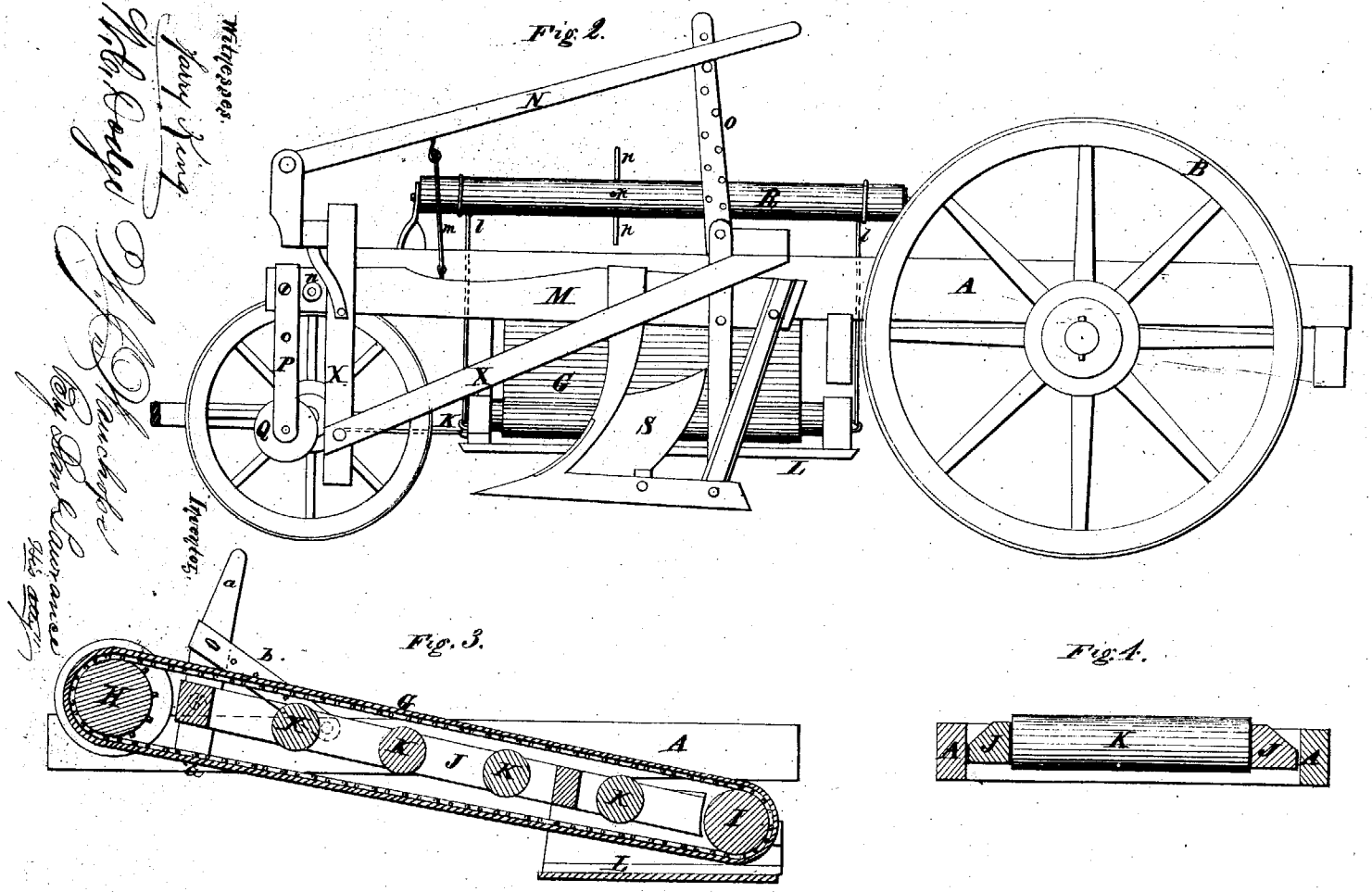
Witnesses.
Harry King
Wm. Dodge
Inventor,
W. J. Wauchope
By Dan'l Lawrance
His Atty.

UNITED STATES PATENT OFFICE.

WILLIAM J. WAUCHOPE, OF BROOKFIELD, ILLINOIS.

IMPROVEMENT IN DITCHING AND GRADING MACHINES.

Specification forming part of Letters Patent No. 62,171, dated February 19, 1867; reissue No. 4,676, dated December 12, 1871.

*To all whom it may concern:*

Be it known that I, WILLIAM J. WAUCHOPE, of Brookfield, in the county of La Salle and State of Illinois, have invented certain new and useful Improvements in Ditching and Grading Machines; and I do hereby declare that the following is a full, clear, and exact description of the same, reference being had to the accompanying drawing making a part of this specification, in which—

Figure 1 is a top or plan view; Fig. 2, a side elevation; Fig. 3, a longitudinal section of the conveyer; and Fig. 4, a transverse sectional view of the same.

Like letters of reference refer to the same parts in all of the figures.

My invention relates to machines for ditching or forming gutters of roads or highways and depositing the earth removed therefrom at the side of such ditch, or upon the road between such ditches or gutters in grading, thus constructing highways or roads in a very rapid and economical manner; and its nature consists in so combining a plow having a side delivery with an endless conveyer revolving transversely with respect to the direction in which the machine is moved that the earth is thrown from the side of the plow directly upon the conveyer and carried and deposited at the required place automatically, and in the several combinations of parts hereinafter more fully set forth.

To enable others skilled in the art to make and use my improved machine, I will describe the same.

In the drawing, A represents a suitable frame, upon which the operating parts of the machine are supported; B, C, and E, wheels mounted upon suitable axles, and upon which the machine is drawn along. The wheel C is provided with gearing and shafting to connect it with the roller H, around which the transverse carrier or conveyer G passes, as shown. M represents a plow-beam, and S a plow having a side delivery or mold-board arranged at the side of the machine, as shown. At the front end of the beam M there is a hanger, P, to the lower end of which is attached a roller or wheel, Q. The beam M is suspended between suitable lateral guides X by means of chain or cord *m* attached to a lever, N, which is pivoted at its front end and is movable up and down at its rear end, and is adjusted and secured at the proper height by means of a pin, *p*, passing through holes in the standard *o*, thus regulating the depth at which the plow is desired to run. The wheel Q serves as a gauge at the front of the plow-beam, the hanger P being so attached that the height of the wheel may be varied. At or near the front end of the plow-beam a friction-roller, *n*, is made to project so as to rest against the vertical bars X′, as shown at Fig. 2, by means of which the plow is drawn along, and is also prevented from being pressed back out of place. The front cross-beam of the frame is made to project out for the attachment of the bars X′, and the plow S is so located that the wheel B will follow in its furrow, so that, the frame being attached to the front axle by a rocker, the machine is always in position for effective service, however deep the ditch may be, within the limits of its operation. G represents the endless conveyer, the upper end of which is supported upon the roller H, which has its bearings in a side extension of the frame A, as shown, and the lower end passes around a roller, I, which has its bearings in a movable platform or runner, L. The platform L is suspended from the main frame by means of the chains or cords *l* and roller or windlass R, by means of which it is raised or lowered, as desired. The windlass R is provided with a ratchet-wheel, U, and pawl V, by which it is held in position, and it is operated by means of the arms *n′*, so located that the driver on the seat T can raise or lower the platform or runner L. A chain or rod, K, is attached to this platform and to the front of the frame to prevent the platform from dragging behind. Any other suitable device or means may be employed to prevent the dragging of the platform and keeping it in position relative to the plow, as a vertical movement is all that is necessary. Within the belt G are arranged auxiliary rollers K to sustain the weight of the earth. These rollers have their bearings in bars J. These bars J are by preference beveled down at their outer edges, as shown at Fig. 4, so as to prevent any earth which may fall over from getting inside of the belt. The lower end of the bars J rest against the roller I or against its bearings at the lower end, and at the upper end is attached a lever, *u*, pivoted at its lower end to the main frame at *a′*. *b* represents a bar or arm fixed upon the stationary or main frame and provided with a series of holes, by means of which and a pin the lever *a* is held in position. As the platform L, containing the roller I, can be moved toward or from the plow, the belt is tightened or loosened by means of the bars J and lever *a*, as shown at Fig. 3. F represents an ordinary tongue or draft-pole, by which the team is hitched to the machine.

The machine is drawn along parallel with the ditch to be dug or the road to be graded, and as it moves along the gutter or ditch is formed by the plow S, which throws the dirt from its side directly upon the conveyer, which carries it to the desired place.

By locating the conveyer at the side of the plow, so that the earth is delivered upon the conveyer without any intermediate device, I am able to build a much more compact machine; am also able to use a plow of the ordinary mold-board form, as used in steel plows, thereby making the machine much easier in its draft and lighter in its operations. Streets, roadways, &c., are by the use of this machine evenly and uniformly graded, and the dirt is removed out of the way in ditching.

The devices shown for operating the conveyer are not described, as any other suitable means may be employed in their stead.

What I claim as new, and desire to secure by Letters Patent, is—

1. The carrying-belt G, mounted in a frame having its end next the plow, suspended from and made adjustable in relation to the main frame or rigid supports located at or near the end aforesaid, substantially as described.

2. The combination of the conveyer G with the fixed roller H, roller I, and the adjustable frame or platform L having its movements independent of the main frame, substantially as described.

3. The arrangement of the longitudinally-adjustable bars J within the endless apron G with the roller I and lever *a*, substantially as and for the purpose specified.

4. The combination of a plow, S, having a side delivery, with a transverse carrying-belt, G, when said plow and the receiving end of the carrying-belt are arranged in line with or nearly in the vertical plane of the main frame or wheels at the side of the machine where the plow is attached, substantially as described.

5. The combination of the plow-beam M and roller or lug *n* with the vertical bars X′ for keeping the plow in proper position when changed in height, substantially as set forth.

6. The combination of an independently-adjustable plow having a side delivery with an independently-adjustable transverse carrying-belt, arranged to operate substantially as set forth.

WILLIAM J. WAUCHOPE.

Witnesses:
B. R. CHAMBERS,
GEORGE M. AUSTIN.

(51)